US 8,976,378 B2

(12) United States Patent
Robinson et al.

(10) Patent No.: US 8,976,378 B2
(45) Date of Patent: Mar. 10, 2015

(54) PRE-FLIGHT SYSTEM FOR PDF/VT

(71) Applicant: Xerox Corporation, Norwalk, CT (US)

(72) Inventors: David C. Robinson, Penfield, NY (US); Karthikeyan Mahadevan, Hermitage, TN (US); Dan Q. Bui, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/908,380

(22) Filed: Jun. 3, 2013

(65) Prior Publication Data

US 2014/0355019 A1  Dec. 4, 2014

(51) Int. Cl.
*G06F 15/00* (2006.01)
*G06F 3/12* (2006.01)
*G06K 1/00* (2006.01)
*G06K 15/02* (2006.01)

(52) U.S. Cl.
CPC .................................. *G06K 15/181* (2013.01)
USPC .......................... 358/1.13; 358/1.9; 358/1.15

(58) Field of Classification Search
None
See application file for complete search history.

(56) References Cited

U.S. PATENT DOCUMENTS

| 8,072,633 B2* | 12/2011 | Fujimori et al. | 358/1.15 |
| 8,488,171 B2* | 7/2013 | Miyata et al. | 358/1.15 |
| 8,767,256 B2* | 7/2014 | Pandit | 358/1.9 |
| 2005/0018229 A1* | 1/2005 | Gusler et al. | 358/1.13 |
| 2007/0229860 A1* | 10/2007 | Matsubara et al. | 358/1.9 |
| 2009/0310152 A1* | 12/2009 | Roulland et al. | 358/1.9 |
| 2012/0081720 A1* | 4/2012 | Pandit | 358/1.9 |
| 2012/0147426 A1* | 6/2012 | Naka et al. | 358/1.18 |
| 2013/0100483 A1* | 4/2013 | Henry et al. | 358/1.15 |

* cited by examiner

*Primary Examiner* — Satwant Singh
(74) *Attorney, Agent, or Firm* — Fay Sharpe LLP

(57) ABSTRACT

A method for validating a splitting operation accesses a document and a catalog tree. The method selects a subset of the total pages in the document. The method splits a section of branches from the catalog tree using a splitter in a user device. Each branch corresponds to a page included in the subset. The method processes the subset using the branches to generate split output pages. The method analyzes each split output page to determine if the file split correctly. In response to a split failure, the method determines if the split failure is related to one of a structure error and a metadata syntax error. In response to a correct split, the method provides the print job to an associated output device in communication with the user device.

20 Claims, 5 Drawing Sheets

PRE-FLIGHT SYSTEM FOR PDF/VT

BACKGROUND

The present disclosure relates to a system and a method that determines whether a file will split correctly on a print server and, more specifically, a system that diagnoses a source of the split failure.

Portable Document Format ("PDF") is a commonly used standard for representing a finished document as fixed content after the document is formatted. A PDF/VT file is a type of PDF file for exchange of variable data and transactional (VT) printing. Generally, the fixed content portion of the PDF functions as a template that can be used in multiple renderings. Each rendering process undergoes a merge with variable data for providing printout or display output with variable content.

In a conventional approach, the PDF/VT file is processed at a printer device, which splits the document into chunks, raster image processes ("RIPs") the chunks, and reassembles the pages from the chunks into correct order for rendering the output. Mainly, the PDF/VT file is divided into multiple chunks using a splitter located at the printer device.

The PDF/VT file can include a catalog tree, known as a Dpart catalog, which contains metadata for the variable rendering of contents defined within the PDF pages. An accompanying Job Definition Format ("JDF") job ticket includes directions for how the metadata is to be used.

The printer-based splitter splits the document based on how the catalog tree is built. In other words, the document is split according to how the catalog tree interacts with the splitter technology. An error can occur when the document splits incorrectly. For a conventional print network and/or device, the fault handling system ceases processing of the print job when the error occurs. The fault handling system does not provide any explanation indicating why the printer ceases to complete processing of the print job. Although, embodiments are contemplated where the printer continues to RIP the print job and reassemble the pages in the incorrect order.

When an error occurs, a user can be inconvenienced by a stalled and/or ceased print job and/or by the task of resending the print instruction to a different printer device. Therefore, the user may not want to commit to printing a long file until it has confidence in the print outcome.

Because various types of printer devices include different splitter embodiments, which can each interact with a DPart hierarchy differently, a system and method are desired which can verify that the splitter can properly split the document before the processing is initiated at the printer device. In this manner, a verification process is desired that reduces the faults that are later caused by errors in a conventional splitting operation.

BRIEF DESCRIPTION

One embodiment of the disclosure relates to a method for validating splitting of a document using a particular output device technology. The method includes accessing at a client computer a file representing a previously created document. The method includes accessing a catalog tree residing in the document and including metadata corresponding with a job ticket embedded in the file for rendering the document. The method includes selecting a subset of the total pages in the document. The method includes splitting a section of branches from the catalog tree using a splitter in a user device. Each branch corresponds to a page included in the subset. The method includes processing the subset using the branches to generate split output pages. The method includes analyzing each split output page to determine if the file split correctly. In response to a split failure, the method includes determining if the split failure is related to one of a structure error and a metadata syntax error. In response to a correct split, the method includes providing the print job to an associated output device in communication with the user device.

Another embodiment of the disclosure relates to a system for validating splitting of a document using a particular output device technology. The system includes a user device. The user device includes comprising a splitter based on a model of an output device in communication with the user device. The splitter splits a section of branches. Each branch corresponds with a page included in a subset of total pages in a document. The user device includes a subset validation module that processes the subset using the branches to generate split output pages. The subset validation module analyzes each split output page to determine if the file split correctly. In response to a split failure, the subset validation module determines if the split failure results from one of a structure error and a metadata syntax error. In response to a correct split, the subset validation module provides the print job to an associated output device in communication with the user device. The user device includes a memory which stores the modules and a processor, in communication with the memory, for executing the modules.

DETAILED DESCRIPTION

Figure 1:
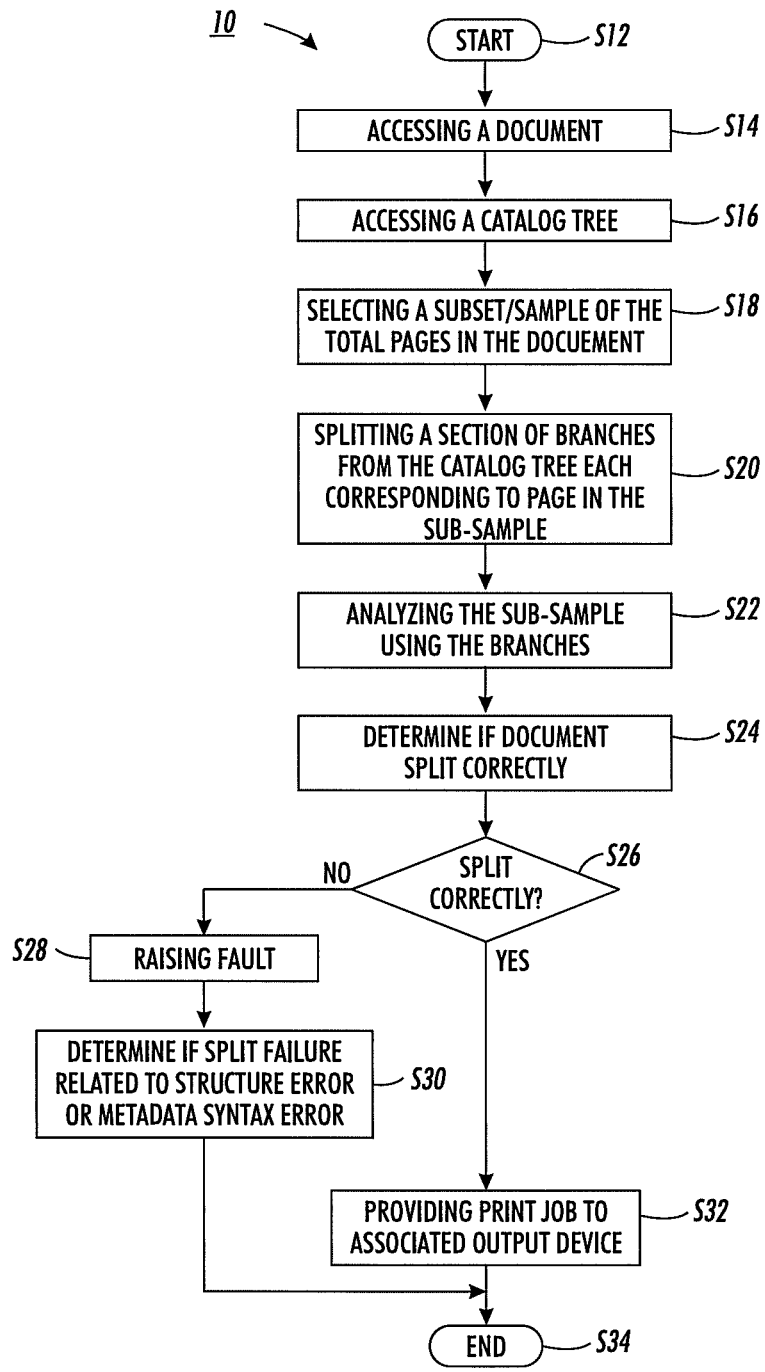
FIG. 1 is a general overview of a method for determining a proper split operation according to the present embodiment.

The present disclosure relates to a system and a method that determines whether a file will split correctly on a print server. FIG. 1 is a general overview of a method 10 for determining a proper split operation. In the contemplated embodiment, the system analyzes the printer-based splitter capability at a client device. In response to a user selecting an application on a graphic user interface, the method is initiated. The method starts at S12. The client device accesses a document at S14. At S16, the client device accesses a catalog tree that contains metadata for the variable rendering of content defined within the PDF pages. A client-based splitter produces a subset of possible chunks at various split boundaries at S18. Mainly, at least one sample is selected from the total pages in the document. Similarly, the client-based splitter splits a section of branches from the catalog tree at S20. Each branch corresponds with a page in the subset. The resultant chunks are analyzed to determine if the correct output is within the chunks at S22. Using the analysis results, the system determines whether the subset split correctly at S24. A correct split, at the subset level, is indicative that the document will split correctly at the printer-based splitter. In response to the subset splitting incorrectly (NO at S26), a fault is raised at S28. The system identifies a reason for the failure at S30. In response to the subset splitting correctly (YES at S26), the client device provides the print job to an associated DFE for processing at S32. The method ends at S34.

Figure 2:
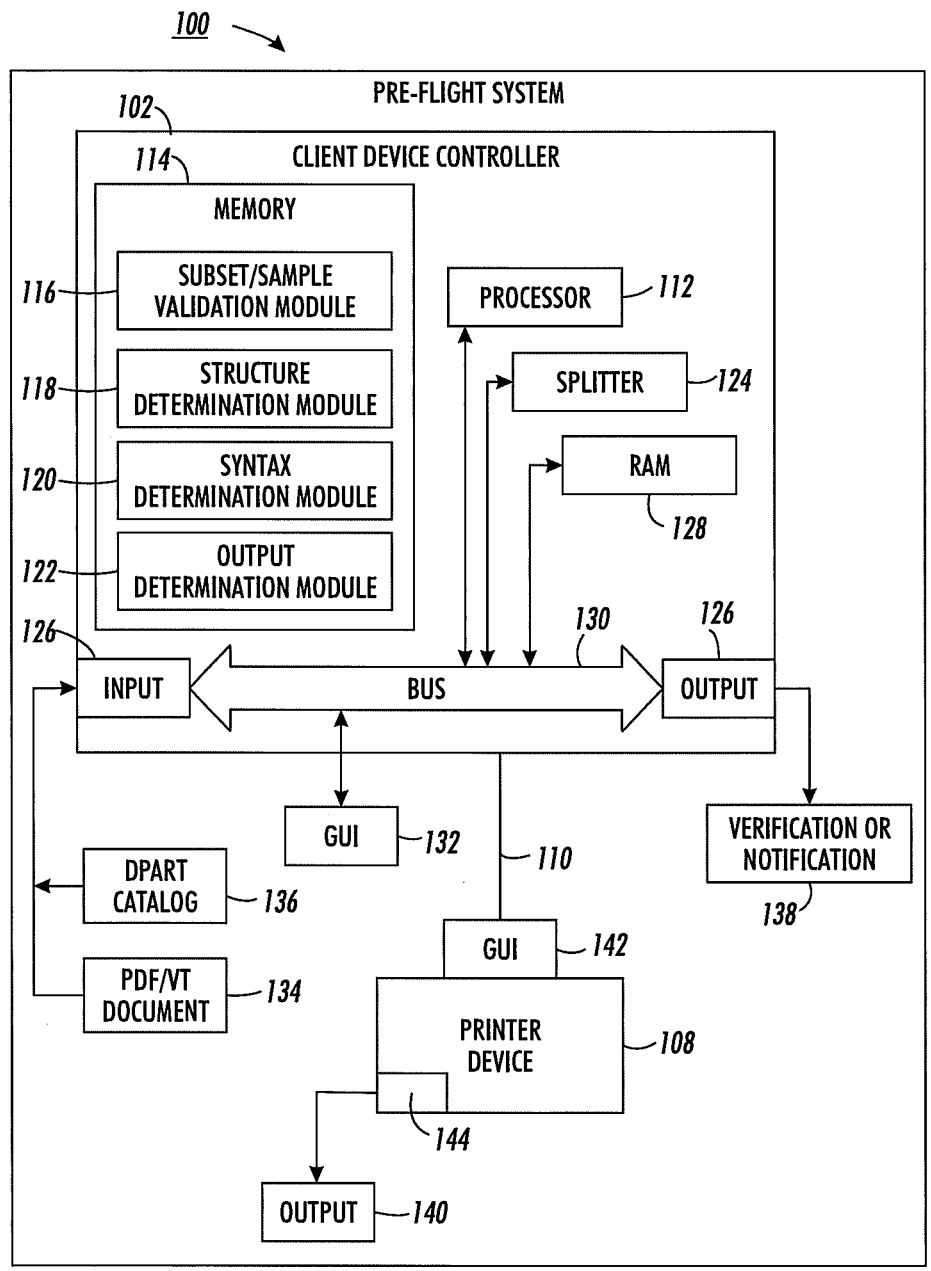
FIG. 2 is a schematic illustration of a system in one aspect of the exemplary embodiment.

FIG. 2 is a functional block diagram of a pre-flight system 100 in one exemplary embodiment. The pre-flight system 100 may include a splitter verification system 102, hosted by a computing device 104, such as a client computer and/or device, and a print job processing system 106, hosted by a digital front end ("DFE"), such as the illustrated printer and/or output device 108, which are linked together by communication links 110, referred to herein as a network. These components are described in greater detail below.

The splitter verification system 102 illustrated in FIG. 2 includes a processor 112, which controls the overall operation of the system 102 by execution of processing instructions, which are stored in memory 114 connected to the processor 112.

The splitting and verification operation disclosed herein is performed by the processor 112 according to the instructions stored in the memory 114. In particular, the memory 114 stores a subset validation module 116, a structure determination module 118, a syntax determination module 120, and an output determination module 122.

The subset validation module 116 selects a sub-sample from the total pages of the document for splitting by a client-based splitter 124. The module 116 also identifies branches from a catalog tree, for splitting by the client-based splitter, that each corresponds to a page in the sub-sample. The module 116 further determines whether the catalog tree meets criteria of the printer-based splitter at the DFE.

When an error occurs, the structure determination module 118 determines if the fault resulted from a structure error. The module 118 determines if the number of split pages equals the number of branches. In response to unequal numbers of split pages and branches, the module 118 determines at least one branch that is incorrectly assembled.

Similarly, when an error occurs, the syntax determination module 120 determines whether commands in the DPart catalog fit the printer-based splitter model located in the output device.

An output determination module 122 generates a modified display representation to simulate the output by overwriting the media box information in the PDF and using the metadata to determine the final dimensions.

These modules 116-122 will be later described with reference to the exemplary method.

The splitter verification system 102 also includes one or more communication interfaces (I/O), such as network interfaces 126 for communicating with external devices, such as output device 108. The various hardware components 112, 114, (random access memory "RAM") 128 of the client device 104 may all be connected by a bus 130.

With continued reference to FIG. 2, the splitter verification system 102 is communicatively linked to a user interface device (GUI) 132 via a wired and/or wireless link. In various embodiments, the user interface device 132 may include one or more of a display device, for displaying information to users, and a user input device, such as a keyboard or touch or writable screen, for inputting instructions and/or receiving status information, and/or a cursor control device, such as a mouse, trackball, or the like, for communicating user input information and command selections to the processor 112. Specifically, the user interface device 132 includes at least one of an input device and an output device, both of which include hardware, and which are communicatively linked with the client device 104 via wired and/or wireless link(s).

With continued reference to FIG. 2, the splitter verification system 102 includes a client-based splitter 124 that is part of or in communication with the client device 104. The client-based splitter 124 is adapted to access the catalog tree 136 from within the PDF/VT document 134 and split the tree into multiple branches, split the PDF/VT document into multiple chunks, and reassemble (reassert) each branch with (within) its corresponding PDF/VT chunk. The chunks, including embedded branch information, can be streamed to the DFE 108 as a package 130.

The splitter verification system 102 verifies that a printer-based splitter can interpret the DPart catalog by splitting and analyzing a sub-sample of pages that undergo a splitter operation using a client-based splitter having knowledge and/or functionality of the printer-based splitter. The client-based splitter is a representation of the splitter on the printer system 106. The system 102 outputs one of a verification and notification 138 indicating whether the catalog tree meets criteria of the print-based splitter based on the correct or incorrect split outcome.

As mentioned, the client device 104 of the pre-flight system 100 is communicatively linked with the DFE 108 via link 110. In response to a correct split, the DFE 108 receives the print job and processes it to generate a display and/or output 140. While the DFE may include an electronic display, for example as part of a graphic user interface 142, the exemplary embodiment includes an image rendering device that may include a marking engine 144, which applies marking medium, such as ink or toner, to a substrate, such as paper, using, for example, a laser, inkjet, thermal, or other transfer process. The printer renders images on print media, such as paper, and can be a copier, laser printer, bookmaking machine, facsimile machine, or a multifunction machine (which includes one or more functions such as scanning, printing, archiving, emailing, and faxing.

The memory 114, 128 may represent any type of tangible computer readable medium such as random access memory (RAM), read only memory (ROM), magnetic disk or tape, optical disk, flash memory, or holographic memory. In one embodiment, the memory 114, 128 may each comprise a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor 112, in addition to controlling the operation of the respective splitter verification system 102, executes instructions stored in memory 114 for performing the parts of the method outlined below.

The software modules as used herein, are intended to encompass any collection or set of instructions executable by the splitter verification system 102 so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The communication interface(s) 126 may include, for example, a modem, a router, a cable, and/or Ethernet port, etc.

As will be appreciated, while two computing devices 104, 108 are illustrated by way of example, the system 100 may be hosted by fewer or more linked computing devices. Each computing device may include, for example, a server computer, desktop, laptop, or tablet computer, smartphone or any other computing device capable of implementing the method described herein.

Figure 3:
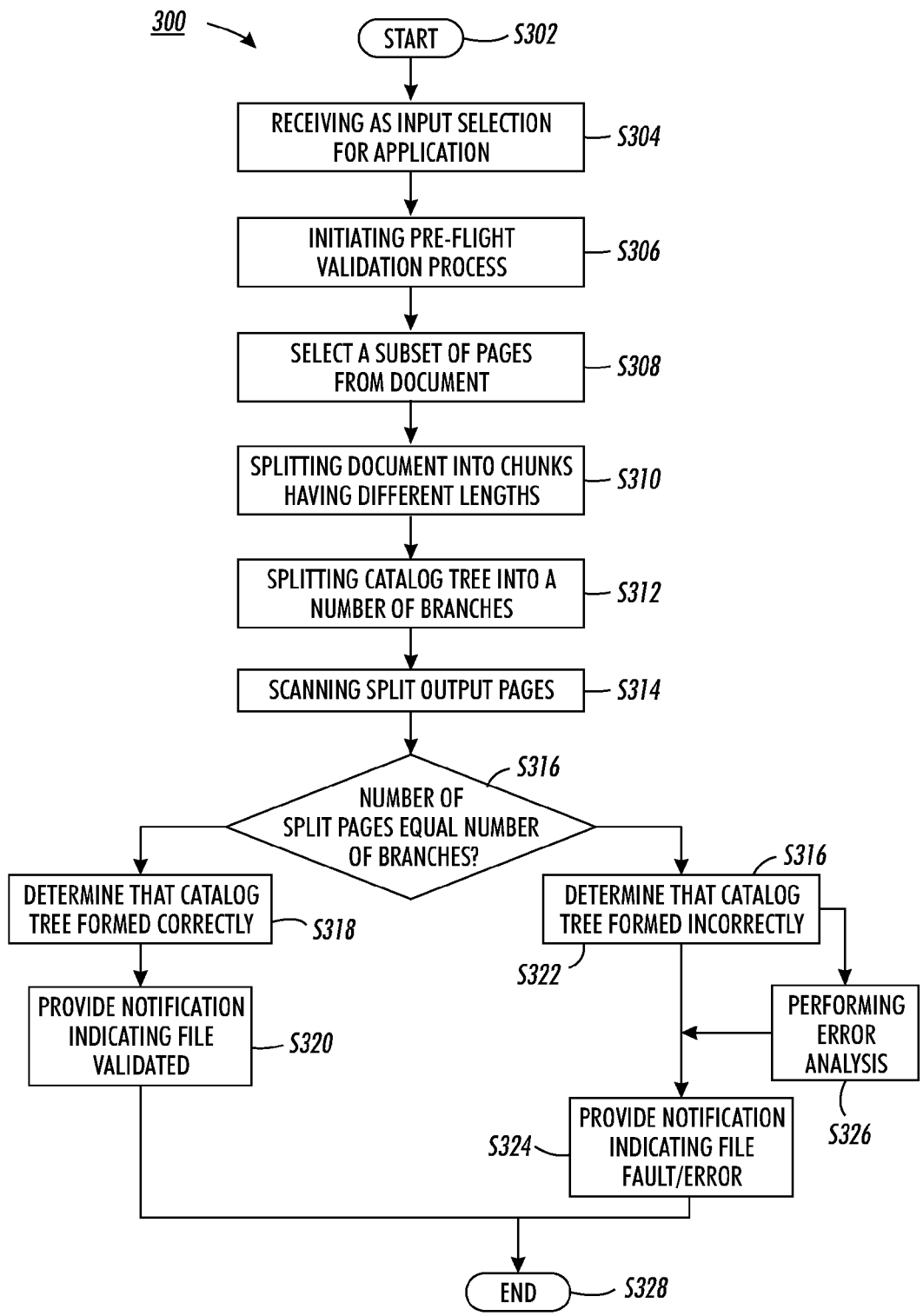
FIG. 3 is a flow chart illustrating a pre-flight process for validating a file according to the exemplary embodiment.

FIG. 3 is a flow chart illustrating an exemplary method 300 for validating a file according to one embodiment. In the discussed embodiment, the file is a PDF/VT document file including a PDF/VT document, catalog tree, and accompanying job ticket. The method starts at S302.

In the contemplated embodiment, a splitter application is packaged for use on client compute platforms. In response to a user-input selecting the application at S304, the pre-flight process is initiated at the client device at S306. In another contemplated embodiment, the pre-flight application can run on the DFE/printer device, thus removing the need to receive status information transmitted from the DFE.

A subset validation module selects at least one subset of pages from the document at S308. Mainly, the subset functions as a sample of the entire document. By splitting and analyzing the subset at the client device, the system can predict results of a full split of the entire document at the DFE. Therefore, the pre-flight process can be performed in a client computing environment to ascertain whether the file will split properly at the DFE before the file is transmitted to the DFE. In other words, the split output that is generated from the subset can be used to determine whether split output for the full document will RIP and/or print as expected at the printer device.

Accordingly, a subset of the total pages is selected to ascertain if the document will split correctly and, in instances where the subset splits incorrectly, to identify a cause and/or a remedy for the fault condition.

A client-based splitter splits the subset into chunks at S310. The application has knowledge of the splitter model and technology used by the printer-based splitter. Accordingly, the client-based splitter splits the subset in the same manner. The client-based splitter is run with different split lengths to determine a validity of the split output. In other words, the client-based splitter can split the subset on different cadences of pages. In one embodiment, predetermined split lengths can be configured by a user via selections made at the graphic user interface. The different split lengths ensure that the split chunks contain page contents across set boundaries. Therefore, the system can determine how any of the splits that cross set boundaries can cause problems.

More specifically, by using different split lengths, the system can determine if the catalog tree splits accurately. Pages are split based on how a catalog tree, associated with the file, interacts with splitter technology. Therefore, pages may not split correctly if the DPart hierarchy is constructed in a way that cannot interact with the particular model of a printer-based splitter. The client-based splitter than splits the catalog tree into a number of branches at S312. Mainly, at least the portion of the catalog tree that corresponds with the subset is split into a number of branches, each associated with a page in the subset.

Continuing with FIG. 3, the split output pages are scanned at S314. The purpose of the scan is to determine if each page has an associated DPart catalog at S316. In response to the number of branches matching the number of split output pages (YES at S316), the system determines that the document file will split correctly at the printer network and/or device at S318. The system can provide a notification indicating that the document is validated at S320.

In response to the number of branches does not match the number of split output pages (NO at S316), the system determines that the catalog tree is formed incorrectly at S322. The system raises a fault message at S324. The fault message notifies a user that the document will not split correctly at the printer network and/or device. This notification is an error message that indicates to a user that the catalog tree associated with the PDF/VT document does not meet the criteria of the printer-based splitter in the printer network and/or device. The fault message can include the erroneous pages to assist in debugging.

In another contemplated embodiment (not shown), the system can determine if the number of branches is greater than or equal to the number of pages. For the number of branches being greater than or equal to the number of pages, the system determines that the document file will split correctly at the printer network and/or device at S318. In other words, the tree can split correctly if the number of branches is larger than the number of pages. For the number of branches being fewer than the number of pages, the system determines that the catalog tree is formed incorrectly.

In summary, the method described for FIG. 3 analyzes a catalog tree to determine if it meets criteria for the printer-based splitter. The messages at S320 and S324 verify that the catalog tree has been analyzed. In the disclosed embodiment, a later discussed error analysis is also performed at S326. The method ends at S328.

The system is adapted to raise faults and/or warnings for indicating that the printing device is not capable of handling either the metadata, the media and/or finishing calls. Mainly, the semantic and structure information is contained within a configuration file. Therefore, an error analysis is performed to determine which one of the semantic and structure information is resulting in the error.

Figure 4:
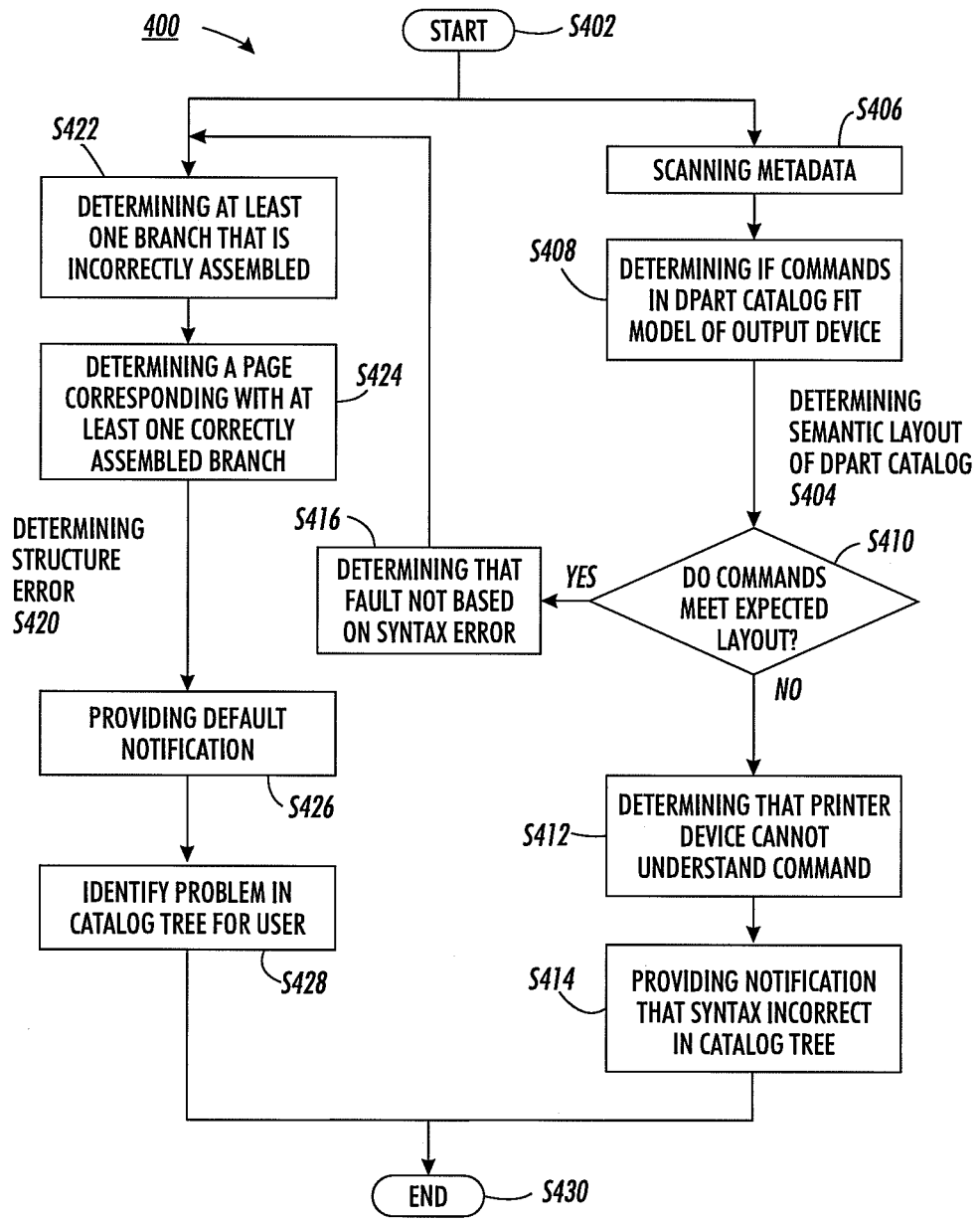
FIG. 4 is a flow chart illustrating an exemplary method for determining a type of split error according to the exemplary embodiment.

FIG. 4 is a flow chart illustrating an exemplary method 400 for performing an error analysis according to one embodiment. The method starts at S402. The error analysis more specifically includes a metadata analysis, which can be used to obtain finishing and media status information from the printer device via an Internet Printing Protocol ("IPP").

The syntax determination module performs an analysis to determine a semantic layout of the catalog tree at S404. The module 120 scans the metadata at S406. The scanned metadata is analyzed to determine if it matches the semantics and the structure defined in the PDF/VT specification at S408. In other words, the module 120 determines if commands in the catalog tree fit the model of the output device at S408. The system searches for text that it might expect in the catalog tree associated with particular finishing or media structure instructions, such as a type of landscape. The system expects the command to be included in the catalog tree in a certain semantic layout. If the command does not meet the expected layout (NO at S410), it determines that the printer device cannot (i.e., will not) understand the command at S412. The system provides a notification indicating that the syntax in the tree structure is incorrect at S414. In one illustrative example, for metadata that contains "StapleLocation RightDualLandscape", a warning and/or fault can be displayed which declares that the particular syntax is not supported on the printer network and/or device. For a command that does meet a syntax layout expected by the printer device (YES at S410), the system determines that the fault is not based on a syntax error at S416. The method can, in one embodiment, determine if the error is (rather) a structure-based error at S420. This determination S420 can be made in parallel with, or in response to, the semantic layout analysis at S404.

The system determines if the fault is being caused by a structure error at S420. Mainly, the structure determination module analyzes the catalog tree to determine how the branches are assembled at S422. The analysis is used to determine where the branches are assembled incorrectly, i.e., e.g., perhaps whether a branch is assembled at the wrong level, i.e., up or down a level. At S424, the module 118 identifies at least one page that is associated with an incorrectly assembled branch. At S426, the system provides notification that the tree structure is incorrect. Mainly, notification indicates that the portion of the catalog tree corresponding to the page number does not meet the criteria of the splitter.

In yet another embodiment, the notification can indicate the problem in the catalog tree and/or instruct the user on how to remedy it at S428.

For example, for a structural command that associates a location of a finishing option that cannot be completed by the printer device, the notification can indicate that the printer device is expecting metadata that identifies in the structure a type and/or model of the device. For example, if the structure is "DPM>HP>Staple 1>StapleLocation Single Portrait" raises a warning and/or fault, the message can state that printer device is expecting the structure to be DPM>Xerox>Staple 1>StapleLocation Single Portrait. DPM stands for DPart metadata a PDF/VT concept. The method ends at S430.

Figure 5:
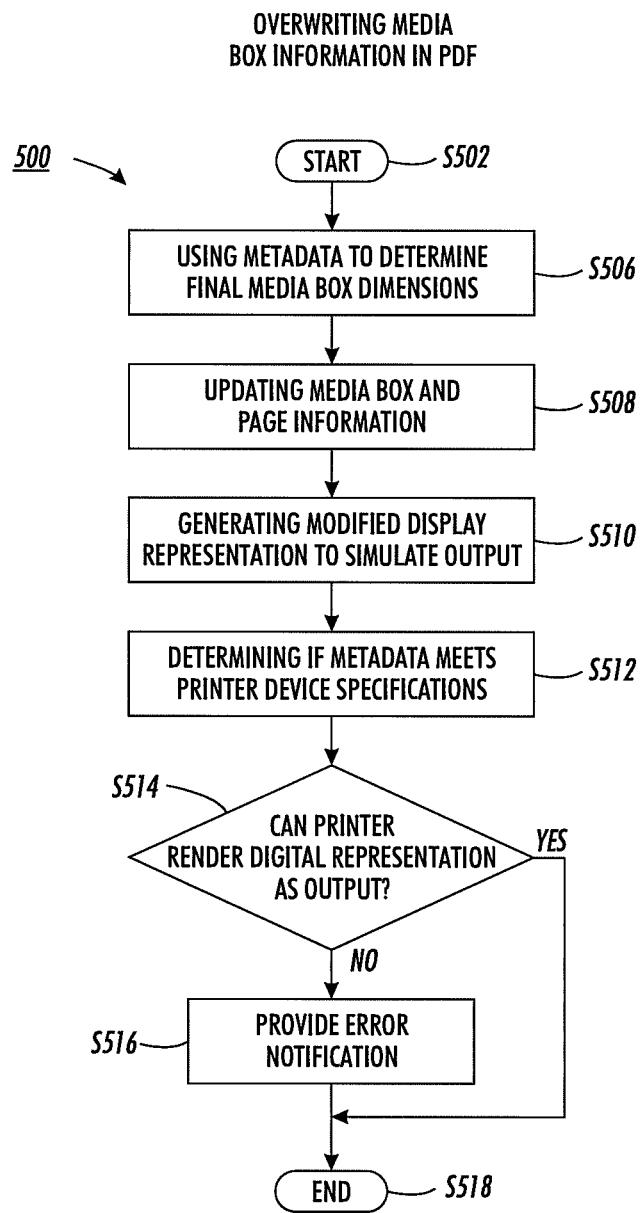
FIG. 5 is a flow chart illustrating an exemplary method for generating a representation simulating a split PDF/VT document.

FIG. 5 shows another aspect of the disclosure, being a flow chart illustrating an exemplary method 500 for generating an electronic representation simulating a split PDF/VT document. The method starts at S402. Using the metadata information within the print job and the IPP status information, a visual simulation of the PDF/VT is performed for a selected print system.

In other words, the method 500 of FIG. 5 is performed to provide the user with a digital output simulation, thus enabling the user to visually validate whether the DFE and/or print device 108 can produce a printed output of the PDF/VT including all of the preselected operations. For illustrative purposes, an example includes when select print/finishing selections, such as a portrait landscape and/or dual staples, is included within the metadata, the system 100 determines if the particular DFE/print device 108 can generate the print result. In another illustrative example, the finishing metadata may require that the output be printed short edge feed ("SEF"). And, by this, the media box and page rotation are appropriately updated for the system 100 to provide a visual representation of the expected print result (of which it is capable of rendering).

To do this, the output determination module 122 must overwrite the media box information in the PDF at S504. The media size metadata information is used to overwrite the media box information in the PDF. The metadata is used by the module 122 to determine the final media box dimensions at S506. The module updates the media box and page information in the PDF to include the final media box dimensions that was extracted and/or retrieved from the metadata at S508. The metadata information (such as, e.g., the media color) is written into the PDF via an addition of a transparent background fill that covers the entire media box. The transparent fill color is determined by a table converting the metadata syntax (e.g., blue) into RGB values (e.g., 0, 0, 100).

The updated media box and page information is used to generate a modified display representation, which simulates the output at S510. In other words, the finished metadata is used to add a visual representation. For example, images (of the front side of a staple and the backside of a staple) are added to the PDF for the first page and last page of a stapled set. The resultant PDF can be viewable in Acrobat.

At S512, the output determination module 122 extracts and analyses the metadata to ascertain whether it can meet the printer device's specifications. By this, the module 122 determines whether the printer device has the capabilities to render an output according to the particular instructions in the metadata. As part of this analysis, the module 122 generates a digital representation using the extracted metadata. In response to the digital representation meeting the device's specifications (YES at S514), the method ends at S518. In response to the digital representation not meeting the device's specifications (NO at S514), the system provides an error notification to the user at S416. The method ends at S418.

In a contemplated alternate embodiment to be performed concurrently with or alternately from the electronic representation, the system can test PS setpagedevice commands using a distiller for converting the PS setpagedevice commands to PDF/VT metadata.

One aspect of the present disclosure includes a system and a method that determines whether a PDF/VT file will split properly on the DFE/printer device by splitting a subset of the document at the client device using a client-based splitter that simulates and/or has knowledge of the printer-based splitter. By determining if the PDF/VT file will split, the system prevents a system crash and/or hang scenario that may result from a split failure in a conventional system.

Another aspect of the disclosure relates to a system and method that determines if the PDF/VT semantics within the PDF/VT print job specification meet the rendering capabilities of the DFE/printer device. As part of this determination process, the system performs an error analysis on a subsample that doesn't split properly. For a subsample that splits properly, the system generates a visual representation of the PDF/VT output, including media color, media size, orientation, and finishing.

Yet another aspect of the disclosure includes providing a user with an option for selectively initiating the application. The system provides the client device with the application, which estimates solutions for metadata and syntax errors.

Although the control methods 10, 300, 400 are illustrated and described above in the form of a series of acts or events, it will be appreciated that the various methods or processes of the present disclosure are not limited by the illustrated ordering of such acts or events. In one embodiment, in FIG. 4, a comparison can be performed first on the semantic information before the structure information. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for validating splitting of a document using a particular output device technology, the method comprising:
   accessing at a client computer a file representing a previously created document;
   accessing a catalog tree residing in the document and including metadata corresponding with a job ticket embedded in the file for rendering the document;
   selecting a subset of the total pages in the document;
   splitting a section of branches from the catalog tree using a splitter in a user device, each branch corresponding to a page included in the subset;
   processing the subset using the branches to generate split output pages;
   analyzing each split output page to determine if the file split correctly;
   in response to a split failure, determining if the split failure is related to one of a structure error and a metadata syntax error; and,
   in response to a correct split, providing the print job to an associated output device in communication with the user device.

2. The method according to claim 1 further comprising:
   splitting at least two sections of branches at different split lengths.

3. The method according to claim 1, wherein the determining the structure error includes:
   scanning the split output pages to determine if each split output page has an associated branch;
   determining if a number of branches equals a number of pages in the subsection;
   in response to the number of branches being not equal to the number of pages, classifying the split failure as resulting from a structure error.

4. The method according to claim 3 further including:
   in response to classifying the split failure as resulting from a structure error, determining at least one branch that is incorrectly assembled; and,
   determining a page corresponding with the at least one branch; and,
   providing a notification indicating that the catalog tree does not meet splitter criteria for an associated splitter in the associated output device.

5. The method according to claim 1 further including:
   for a split failure resulting from a structure error, outputting default message indicating that the catalog tree does not meet the splitter criteria.

6. The method according to claim 1, wherein the splitter in the user device is based on a model of the output device.

7. The method according to claim 1, wherein the determining the metadata syntax error includes:
   analyzing a semantic layout of the catalog tree.

8. The method according to claim 7, wherein the analyzing the semantic layout includes:
   determining if commands in the section of the catalog tree fit a model of the associated output device in communication with the user device; and,
   in response to determining that a command in the section of the catalog tree does not meet an expected layout instructed in the metadata, providing a notification to the user.

9. The method according to claim 1 further comprising:
   extracting the metadata;
   overwriting default instructions for a display representation of the document in a complete format;
   generating a modified display representation using instructions in the metadata.

10. The method of claim 9, wherein the format is a Portable Document Format (PDF).

11. The method according to claim 10, wherein the overwriting the default instructions includes:
    overwriting media box information in the PDF;
    using the metadata to determine final media box dimensions;
    updating the media box and page information; and,
    generating the modified display representation to simulate output.

12. The method of claim 1 further comprising:
    producing a digital representation of the document using the metadata;
    using the digital representation to determine whether the metadata can be met by specifications of the associated output device;
    in response to the metadata not meeting the specifications, providing an error notification.

13. The method according to claim 1, further including:
    in response to a split failure, providing an instruction for remedying the fault.

14. A system for validating splitting of a document using a particular output device technology, the system comprising:
    a user device comprising:
      a splitter based on a model of an output device in communication with the user device, the splitter being adapted to split a section of branches from a catalog tree residing in the document and including metadata corresponding with a job ticket embedded in the file for rendering the document, each branch corresponding to a page included in a subset of total pages in a document;
      a subset validation module adapted to:
        process the subset using the branches to generate split output pages,
        analyze each split output page to determine if the file split correctly,
        in response to a split failure, determine if the split failure results from one of a structure error and a metadata syntax error, and
        in response to a correct split, provide the print job to an associated output device in communication with the user device;
      a memory which stores the modules; and,
      a processor, in communication with the memory for executing the modules.

15. The system according to claim 14, further comprising a structure determination module adapted to analyze the subset for a structure error, the structure determination module being adapted to:
    scan the split output pages to determine if each split output page has an associated branch;
    determine if a number of branches equals a number of pages in the subsection;
    in response to the number of branches being not equal to the number of pages, classify the split failure as resulting from the structure error.

16. The system according to claim 15, wherein the structure determination module is further adapted to:
    in response to classifying the split failure as resulting from a structure error, determine at least one branch that is incorrectly assembled; and,
    determine a page corresponding with the at least one branch; and, provide a notification indicating that the catalog tree does not meet splitter criteria for an associated splitter in the associated output device.

17. The system according to claim 14 further comprising a syntax determination module adapted to analyze a semantic layout of the catalog tree, the syntax determination module being adapted to:
   determine if commands in the section of the dpart tree fit a model of the associated output device in communication with the user device; and,
   in response to determining that a command in the section of the dpart tree does not meet an expected layout instructed in the metadata, provide a notification to the user.

18. The system according to claim 14 further comprising an output determination module adapted to:
   extract the metadata;
   overwrite default instructions for a display representation of the document in a complete format;
   generate a modified display representation using instructions in the metadata; and,
   display the modified display representation.

19. The system according to claim 18, wherein the output determination module is further adapted to:
   overwrite media box information in a PDF;
   use the metadata to determine final media box dimensions;
   update the media box and page information; and,
   generate the modified display representation to simulate output.

20. The system according to claim 18, wherein the output determination module is further adapted to:
   produce a digital representation of the document using the metadata;
   use the digital representation to determine whether the metadata can be met by specifications of the associated output device;
   in response to the metadata not meeting the specifications, provide an error notification.

\* \* \* \* \*